United States Patent
Rodriguez et al.

(10) Patent No.: US 10,812,587 B1
(45) Date of Patent: Oct. 20, 2020

(54) DATA STORAGE AND RETRIEVAL IN REDUNDANT STORAGE SYSTEMS

(71) Applicant: Amazon Technologies, Inc., Seattle, WA (US)

(72) Inventors: Sebastien Alexandre Roland Rodriguez, Dublin (IE); Gary Taylor, Dublin (IE); Julio Delgado Mangas, Dublin (IE)

(73) Assignee: Amazon Technologies, Inc., Seattle, WA (US)

( * ) Notice: Subject to any disclaimer, the term of this patent is extended or adjusted under 35 U.S.C. 154(b) by 880 days.

(21) Appl. No.: 14/836,897

(22) Filed: Aug. 26, 2015

(51) Int. Cl.
  *G06F 15/16* (2006.01)
  *H04L 29/08* (2006.01)

(52) U.S. Cl.
  CPC .......... *H04L 67/1097* (2013.01); *H04L 67/16* (2013.01)

(58) Field of Classification Search
  CPC ............... H04L 63/0428; H04L 9/3247; H04L 67/1097; H04L 63/123; H04L 9/0643; H04L 2209/60; H04L 67/104; H04L 65/4084; H04L 65/60; H04L 67/16; H04L 67/1044; H04L 67/108; G06F 16/2365
  USPC ......................................................... 709/217
  See application file for complete search history.

(56) References Cited

U.S. PATENT DOCUMENTS

| | | | | |
|---|---|---|---|---|
| 2003/0204613 A1* | 10/2003 | Hudson | .................. | D01D 5/423 709/231 |
| 2011/0179328 A1* | 7/2011 | Souza | ................. | H04N 21/4788 714/748 |
| 2012/0005165 A1* | 1/2012 | Tsai | ..................... | G06F 11/1456 707/652 |
| 2012/0124381 A1* | 5/2012 | Kim | ...................... | H04L 9/0643 713/176 |
| 2013/0060804 A1* | 3/2013 | Bernbo | .............. | G06F 16/2365 707/769 |
| 2013/0064370 A1* | 3/2013 | Gouge | ................ | H04L 63/0428 380/255 |
| 2015/0378842 A1* | 12/2015 | Tomlinson | .............. | G06F 21/40 380/28 |
| 2017/0366353 A1* | 12/2017 | Struttmann | ............. | G06F 21/64 |

* cited by examiner

*Primary Examiner* — Oleg Survillo
(74) *Attorney, Agent, or Firm* — Davis Wright Tremaine LLP

(57) ABSTRACT

A computing resource service receives a request to retrieve data, wherein fulfillment of the request involves retrieval of representations of the data from a number of datastores maintained by the service. The service transmits requests to individual datastores to retrieve the representations of the data. Before all responses to these requests are received, the service evaluates any received responses to determine whether a quorum has been reached with regard to the representations of the data. If so, the service consolidates the representations of the data and provides the consolidated data to fulfill the request.

20 Claims, 9 Drawing Sheets

DATA STORAGE AND RETRIEVAL IN REDUNDANT STORAGE SYSTEMS

BACKGROUND

Customers and other users of a computing resource service provider may utilize a variety of services of the computing resource service provider to store and retrieve data. This data may be redundantly stored within a variety of datastores of these services in order to prevent or otherwise reduce the potential for data loss in the event that a datastore is rendered inoperable. For instance, in response to a request to store data for a customer or other user, the service may generate various representations of the data and store these representations within various datastores. Similarly, when a customer or other user submits a request to retrieve data from the service, the service may obtain the various representations of the data from the various datastores and determine what data is to be provided in response to the request. However, retrieving or storing the various representations of data may be time intensive. For instance, a customer or other user may not receive confirmation of successful storage of its data until the representations have been successfully stored within the various datastores. Further, the service may not provide a response to a customer's data retrieval request until all representations of data have been obtained and analyzed to determine the definitive data that is to be provided.

BRIEF DESCRIPTION OF THE DRAWINGS

Various embodiments in accordance with the present disclosure will be described with reference to the drawings, in which.

DETAILED DESCRIPTION

Figure 1:
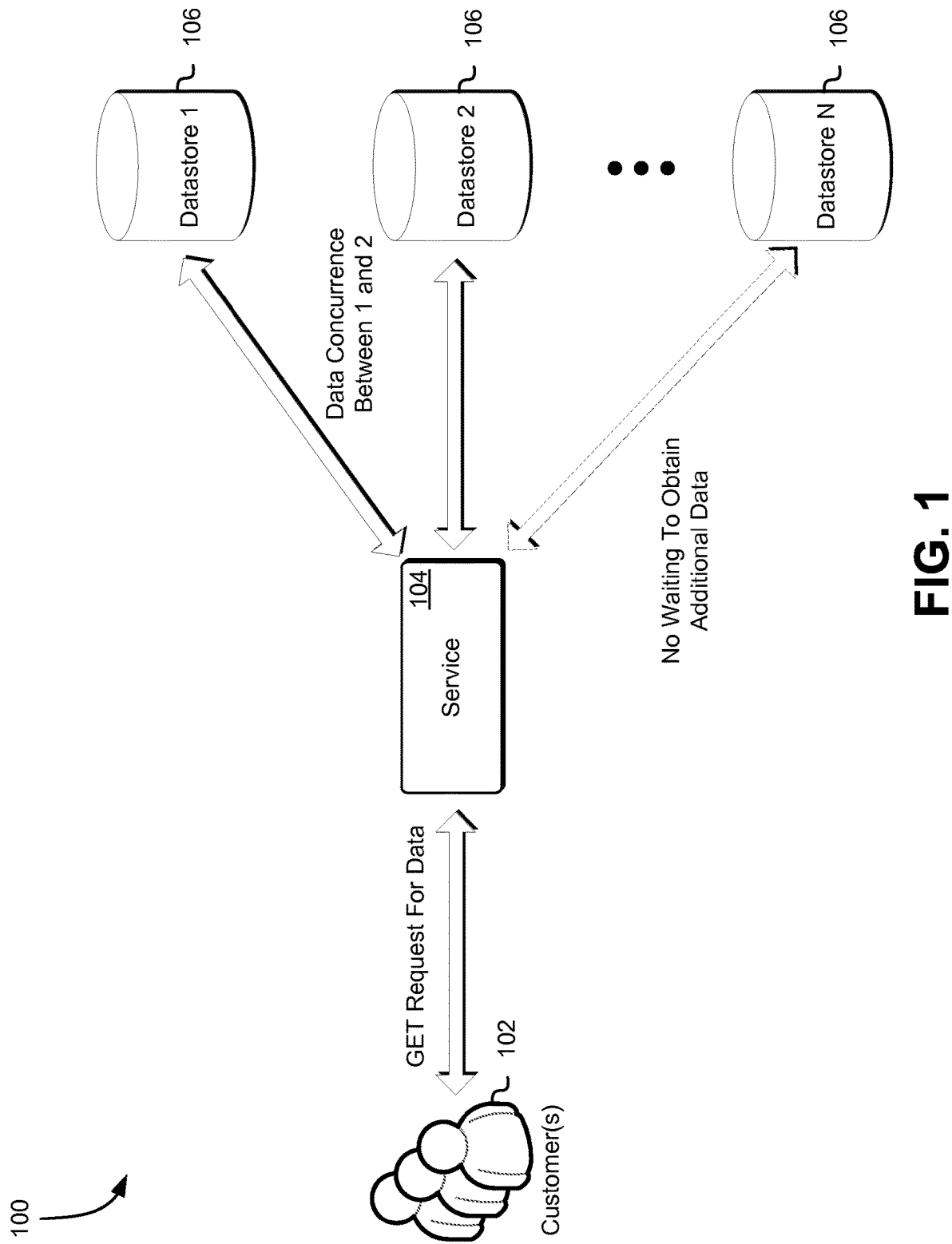
FIG. 1 shows an illustrative example of an environment in which one or more requests to retrieve data from redundant datastores is fulfilled in accordance with at least one embodiment.

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Techniques described and suggested herein relate to the retrieval of data from various redundant datastores in a manner that the data is provided as soon as a quorum is achieved for the data and to the storage of representations of data in a minimum number of datastores before successful storage of the data is reported. In one example, when a computing resource service receives a request to retrieve data on behalf of a customer of a computing resource service provider, the service identifies the datastores that may include representations of the data necessary to fulfill the request. The service may transmit requests to each of these identified datastores to retrieve these representations of the data in order to determine what data is to be provided in response to the request. The representations of the data from these datastores may arrive asynchronously, such that representations of the data may arrive at different times.

When the service receives a number of representations of the data from the identified datastores sufficient to achieve a quorum for providing the requested data, the service may compare the representations of the data received. If the representations of the data each comprise various segments, the service may compare each segment to determine whether a quorum can be reached for that segment. For instance, if the quorum requirement is two similar representations of the data to provide a definitely result, the service may compare two received representations of data and, for each segment for which there is agreement, determine that the segment is correct for the requested data. This segment may thus be used to consolidate the data necessary to fulfill the request. If quorum is achieved, the service may stop monitoring for additional representations of the data and provide the data in response to the request. However, if a quorum has not been reached based on the received representations of the data, the service may determine whether a timeout period has passed or if a quorum can be achieved. If the timeout period has passed or a quorum cannot be achieved, the service may indicate that it is unable to fulfill the request. Alternatively, the service may utilize a variety of conflict resolution rules to determine which data is to be provided in response to the request. For instance, each datastore may be assigned different weights, which may be used to select which representations of the data are to be used to consolidate the data to be provided in response to the request.

If the timeout period has not passed and a quorum is still possible, the service may await additional representations of data from other datastores in order to determine what data is to be provided in response to the request. For instance, as more representations of the data are received, the service may continue to compare these representations of the data to determine whether a quorum has been achieved among a minimum number of representations of the data. If so, the service may stop monitoring for additional representations of the data and compile the representations of the data used to achieve a quorum to generate the data necessary to fulfill the request. The service may then provide this consolidated data in response to the request.

In another example, the service receives a request to store data on behalf of a customer of the computing resource service provider. In response to the request, the service may identify a number of datastores that may be used to redundantly store representations of the data on behalf of the customer. The service may generate a number of representations of the data equal to the number of identified datastores and transmit a request to each of these datastores to store a representation of the data. When a datastore successfully stores a representation of the data, the datastore may transmit a notification to the service to indicate that the representation of the data has been successfully stored within. As with the receipt of representations of the data in response to a request to obtain representations of the data, these notifications may also be received asynchronously by the service.

When the service receives notifications of successful storage from a number of datastores, the service may determine whether a quorum has been reached. For instance, if the representations of the data have been successfully stored within a minimum number of datastores required to achieve a quorum, the service may notify the customer that the data has been successfully stored within the datastores of the service. Further, the service may stop monitoring for additional notifications from the datastores indicating successful storage of their respective representations of the data. If the service has not received sufficient storage confirmations to achieve a quorum, the service may determine whether a timeout period has elapsed or if a quorum is no longer possible (e.g., too many failure notifications, etc.). If the timeout period has passed without a quorum or a quorum is no longer possible, the service may notify the customer of its inability to successfully store the data. However, if the timeout period has not elapsed and a quorum is still possible, the service may await additional responses from the datastores until a quorum has been achieved. Once the quorum is achieved, the service may notify the customer of successful storage of the data.

In this manner, a service may indicate successful storage of data or provide the data once a quorum has been achieved among a minimum number of datastores without need to await notification or data from all datastores. In addition, the techniques described and suggested herein facilitate additional technical advantages. For instance, because the service may stop monitoring for additional representations of the data or for confirmation of successful storage of data once a quorum has been achieved, the service may also cancel any pending requests to other datastores once the quorum has been achieved. This may prevent unnecessary processing of requests from these other datastores, thereby reducing the resources utilized to fulfill customer requests to store data or to obtain data from the service.

FIG. 1 shows an illustrative example of an environment 100 in which one or more requests to retrieve data from redundant datastores 106 are fulfilled in accordance with at least one embodiment. In the environment 100, a customer 102 may submit a request to a computing resource service 104 to obtain data. For instance, a customer 102 of the computing resource service provider may transmit a request to the computing resource service 104 to retrieve any number of measurements from various aggregator datastores 106. The request to retrieve the measurements may be provided in the form of an application programming interface (API) call to the computing resource service 104, such as a GET call. In order for the computing resource service 104 to obtain the measurements necessary to fulfill the request, the customer 102 may be required to provide metadata that may be used to generate a fully qualified metric identifier (FQMI) for the data that is to be obtained. The FQMI may be an identifier that uniquely (at least in some relevant space) identifies data. In some examples, the FQMI is generated using metadata that may uniquely identify the data. Example metadata includes a customer account number, the namespace (e.g., associated service for the computing resource), the dimensions for the data (e.g., key/value pairs), the name of the data itself, and the like. In some examples, the FQMI may be generated by hashing at least a subset of: the metadata, the timestamp for the data, the unit of metric for the data, and the data itself. The computing resource service 104 may utilize the FQMI to identify the one or more locations of the data (e.g., datastores 106).

In an embodiment, once the computing resource service 104 has identified the one or more datastores 106 that include representations of the requested data, the computing resource service 104 transmit a request to each of these one or more datastores 106 to retrieve a representation of the requested data from each of these one or more datastores 106. Each datastore 106 may receive this request from the computing resource service 104 and provide the requested representation of the data needed to fulfill the customer request. However, the requested representation of the data may be provided to the computing resource service 104 asynchronously. For instance, communications channels between the computing resource service 104 and each of the one or more datastores 106 may differ such that there may be different levels of latency among the one or more datastores 106. In some instances, one or more datastores 106 may comprise different hardware components, which may impact the response time of the datastores 106. There may also be instances where a datastore 106 may be offline due to a hardware failure or performance of maintenance actions whereby it is required that the datastore 106 be offline. Thus, the computing resource service 104 may receive representations of data from the one or more datastores 106 at different times.

When the computing resource service 104 receives a number of representations of the requested data from the one or more datastores 106, the computing resource service 104 may evaluate these representations of the requested data to determine whether a quorum may be reached. In an embodiment, the computing resource service 104 is configured to determine that data can be provided in response to a request once a minimum number of data samples from the datastores 106 are equivalent. For instance, if a customer 102 has requested data for a particular measurement, the computing resource service 104 may evaluate the obtained data from the datastores 106 to determine if the data is identical. If a number of data samples from the datastores 106 are identical and this number is greater than or equal to a minimum number of data samples required for a quorum, the computing resource service 104 may determine that a quorum has been reached and provide the data to the customer 102 in response to its request. Further, in an embodiment, the computing resource service 104 will stop monitoring the datastores 106 for additional representations of the requested data, as these representations may no longer be required to determine what data is to be provided to the customer 102.

If the requested data comprises a plurality of data segments, when the computing resource service 104 receives the requested data from a number of datastores 106, the computing resource service 104 may evaluate each data segment from the received data to determine whether there is a quorum for the data segment. If so, the computing resource service 104 may determine the data to be provided for the particular data segment. If a quorum cannot be reached for a particular data segment, the computing resource service 104 may determine whether a timeout period has elapsed for the requests or if a quorum remains possible after evaluation of the received data. If the timeout period has elapsed or quorum for the remaining data segments is not possible, the computing resource service 104 may consolidate the data segments for which quorum was achieved and provide these data segments to the customer 102 in response to its request. Additionally, the computing resource service 104 may indicate that it was unable to successfully obtain data for the data segments for which a timeout condition has occurred or a quorum could not be reached.

In some embodiments, the computing resource service 104 assigns a weight to each datastore 106, which may be utilized in the performance of one or more conflict resolution tests in the event that a quorum cannot be reached. For instance, the computing resource service 104 may assign a greater weight to datastores 106 with a higher level of accuracy compared to other datastores over time. Alternatively, a greater weight may be assigned to a datastore 106 that utilizes up-to-date components in comparison to other datastores in the fleet. Thus, if a quorum cannot be achieved, the computing resource service 104 may select data corresponding to the datastores 106 with the greater combined weight. This may ensure that data may be provided to the customer 102 in response to its request regardless of whether a quorum may be reached. However, this may also be subject to a threshold total weight such that if the threshold total weight is not satisfied, the computing resource service 104 may indicate an inability to provide the requested data.

Once the computing resource service 104 has achieved a quorum for each of the data segments, the computing resource service 104 may stop monitoring for data from any remaining datastores 106 for which data has not been received. In an embodiment, the computing resource service 104 further terminates any requests that have not been fulfilled by the remaining datastores 106. This may prevent these datastores 106 from performing additional searches for the requested data or to transmit this data to the computing resource service 104, as the data may no longer be required for evaluation.

The computing resource service 104, upon achieving quorum for the requested data, may consolidate the data such that the data may be provided to the customer 102 in response to its request. For instance, if the data comprises various data segments, the computing resource service 104 may organize these data segments for which quorum has been achieved in a manner that may be usable by the customer 102 or comports with the format requested by the customer 102. The consolidated data may correspond to the best answer that may be achieved through evaluation of data received from a minimum number of datastores 106 whereby quorum may be reached. Thus, the consolidated data may include data from different datastores 106 in a manner that the consolidated data represents the most common data among these different datastores 106 based at least in part on the quorum threshold. It should be noted that while FIG. 1 illustrates that a quorum has been reached as a result of at least two datastores 106 providing concurring data, a quorum may be reached if a minimum number of data samples from the various datastores 106 provide concurrence. For instance, a quorum may be reached when a majority of the datastores 106 have provided concurrent copies or representations of the data to the service 104. Alternatively, a quorum may be reached when a minimum number of the datastores 106 have provided concurrent copies or representations of the data, whereby this minimum number may not necessarily correspond to a majority of the datastores 106 of the fleet. In some instances, a quorum may be reached for each data segment of the data based at least in part on the number of concurrent data segment samples among the various representations of data from the datastores 106.

It should also be noted that while datastores 106 are used extensively throughout the present disclosure for the purpose of illustration, other computer systems may be used to obtain representations of data and techniques described herein may be utilized for various purposes. For example, a health monitoring service may transmit one or more GET API calls to a fleet of health monitoring systems to determine the health of a computing environment. The health monitoring service may receive one or more responses from the health monitoring systems and, based at least in part on these responses, determine whether a quorum has been reached for the status of the computing environment. If a quorum is reached, the status of the computing environment may be reported to an administrator or other computer system for monitoring of the computing environment.

Figure 2:
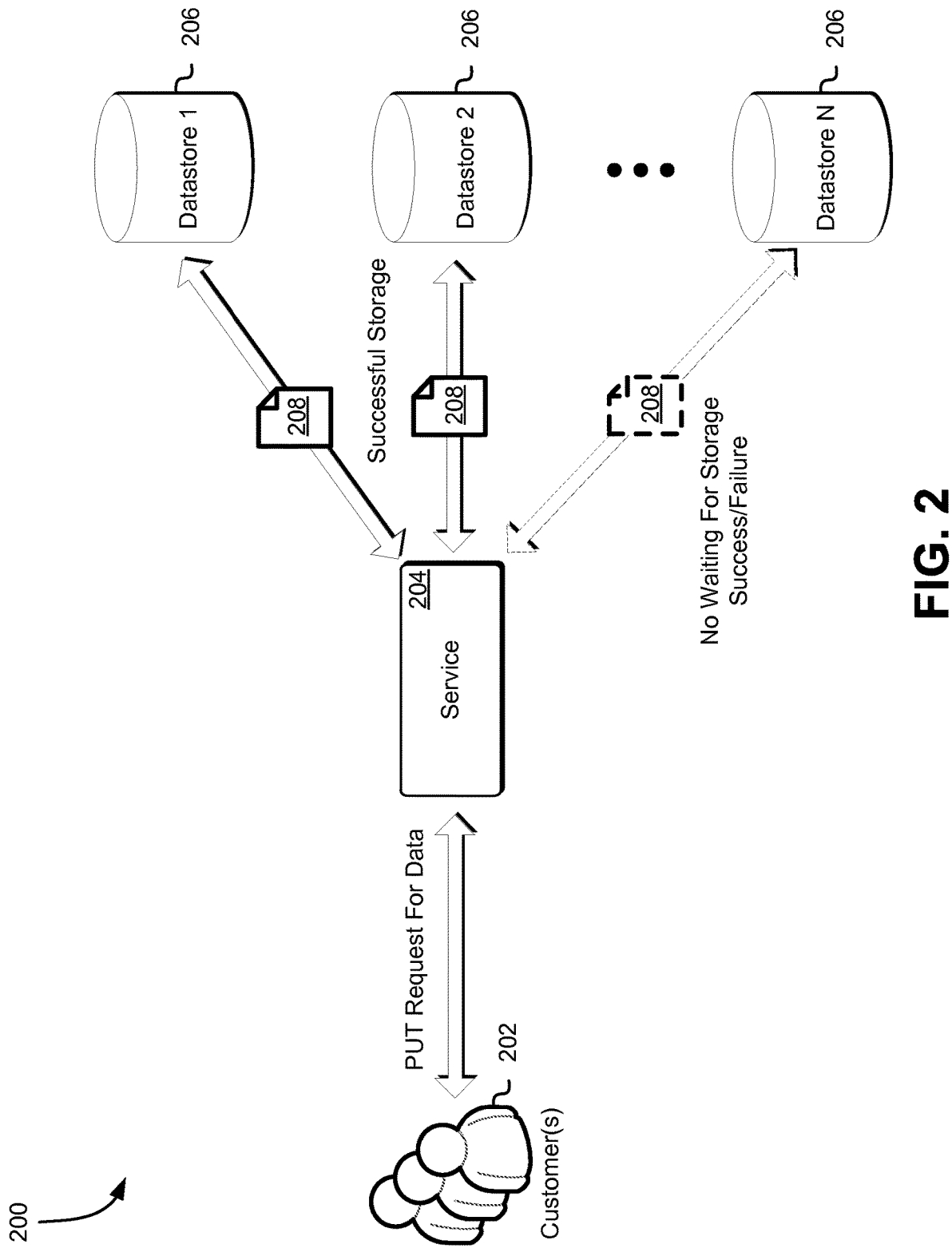
FIG. 2 shows an illustrative example of an environment in which one or more requests to redundantly store data is fulfilled by storing representations of the data within various redundant datastores in accordance with at least one embodiment.

As noted above, when a customer submits a request to a computing resource service to store data on behalf of the customer, the computing resource service may replicate the provided data such that representations of the data may be redundantly stored among a number of datastores. In an embodiment, the computing resource service will monitor these datastores for confirmation of successful storage of the representations of the data until a quorum of datastores has been reached. Once this occurs, the computing resource service may stop monitoring for additional confirmations from other datastores and confirm that the data has been successfully stored. Accordingly, FIG. 2 shows an illustrative example of an environment 200 in which one or more requests to redundantly store data is fulfilled by storing representations of the data 208 within various redundant datastores 206 in accordance with at least one embodiment.

In the environment 200, a customer 202 may submit a request to a computing resource service 204 to redundantly store data within various datastores 206 maintained and operated by the computing resource service 204 or by the computing resource service provider itself. The request to store the data may be provided in the form of an API call to the computing resource service 104, such as a PUT call. The data may be provided by the customer 202 itself within the request to the computing resource service 204. Alternatively, the customer 202 may specify an intermediate location where the data may be currently stored, such as a datastore of another service or within the customer's own datastores or storage devices. This may enable the computing resource service 204 to retrieve the data that is to be redundantly stored within its datastores 206.

When the computing resource service 204 receives the customer's request to redundantly store data within its various datastores 206, the computing resource service 204 may identify which datastores 206 may be used to store representations of the data 208. For instance, the computing resource service 204 may determine the available storage capacity within each of the various datastores 206 and determine which datastores 206 have sufficient available capacity to support storage of the representations of the data 208. Additionally, or alternatively, the computing resource service 204 may select a predetermined number of datastores 206 at random that may be used to redundantly store representations of the data 208.

Once the computing resource service 204 has identified the datastores 206 that are to be used to store representations of the data 208, the computing resource service 204 may utilize the provided to generate a number of representations of the data 208 equal to the number of datastores 206 that have been identified for storage of these representations of the data 208. Subsequently, the computing resource service 204 may transmit these representations of the data 208 to their corresponding datastores 206 for storage. Each datastore 206 may be configured to transmit a notification to the computing resource service 204 once storage of its representation of the data 208 has been stored successfully or if storage of its representation of the data 208 could not be completed successfully. However, as with the datastores described above in connection with FIG. 1, the datastores 206 may each comprise different hardware components which may affect how quickly data is stored within the datastores 206 or how quickly the notification is generated and transmitted to the computing resource service 204. Thus, the computing resource service 204 may receive notifications from these datastores 206 at different times.

As the computing resource service 204 receives notifications from the datastores 206 regarding the storage of their respective representations of the data 208, the computing resource service 204 may determine whether a quorum has been reached whereby a minimum number of datastores 206 have successfully stored their representations of the data 208. For example, if a quorum is reached when at least two datastores 206 have successfully stored the representations of the data 208, and the computing resource service 204 has obtained notifications from two datastores 206 that storage of the representations of the data 208 has been performed successfully, then the computing resource service 204 may determine that the quorum has been reached and stop monitoring for additional notifications from other datastores 206. Further, the computing resource service 204 may transmit a notification to the customer 202 confirming that the data has been successfully stored within the datastores 206. In an embodiment, once a quorum has been reached, the computing resource service 204 will cancel any pending requests to other datastores 206 that have yet to provide a notification concerning storage of the representations of the data 208. Since the quorum has been achieved, this may prevent unnecessary storage of the representations of the data 208, thereby leaving storage capacity for other data.

If the computing resource service 204 receives notifications from the datastores 206, but a quorum cannot be reached with regard to successful storage of the representations of the data 208, the computing resource service 204 may determine whether a timeout period has elapsed and whether a quorum remains possible. If the timeout period has elapsed without a quorum or a quorum is no longer possible due to too many storage failures within the datastores 206, the computing resource service 204 may indicate to the customer 202 that it is unable to fulfill the customer's request to store the data within the datastores 206. Alternatively, if the timeout period has not elapsed and a quorum is still possible among the remaining datastores 206, the computing resource service 204 may await additional responses from the remaining datastores 206. Once the computing resource service 204 receives additional responses from these remaining datastores 206, the computing resource service 204 may again determine whether a quorum has been reached, indicating successful storage of the representations of the data 208 within the datastores 206.

It should be noted that while quorums requiring a minimum of two responses indicating successful storage from the datastores 206 are used throughout the present disclosure for illustrative purposes, quorums may be defined based at least in part on different criteria. For example, a quorum may be reached when a majority of the datastores 206 have returned a response indicating successful storage of a representation of the data, where a majority may be greater than two datastores 206 for larger fleets. Alternatively, a quorum may be reached if a minimum number of responses indicating successful storage of the representations of the data 208 are received, regardless of the size of the fleet of datastores 206. However, this minimum number may also be greater than two in some instances.

Figure 3:
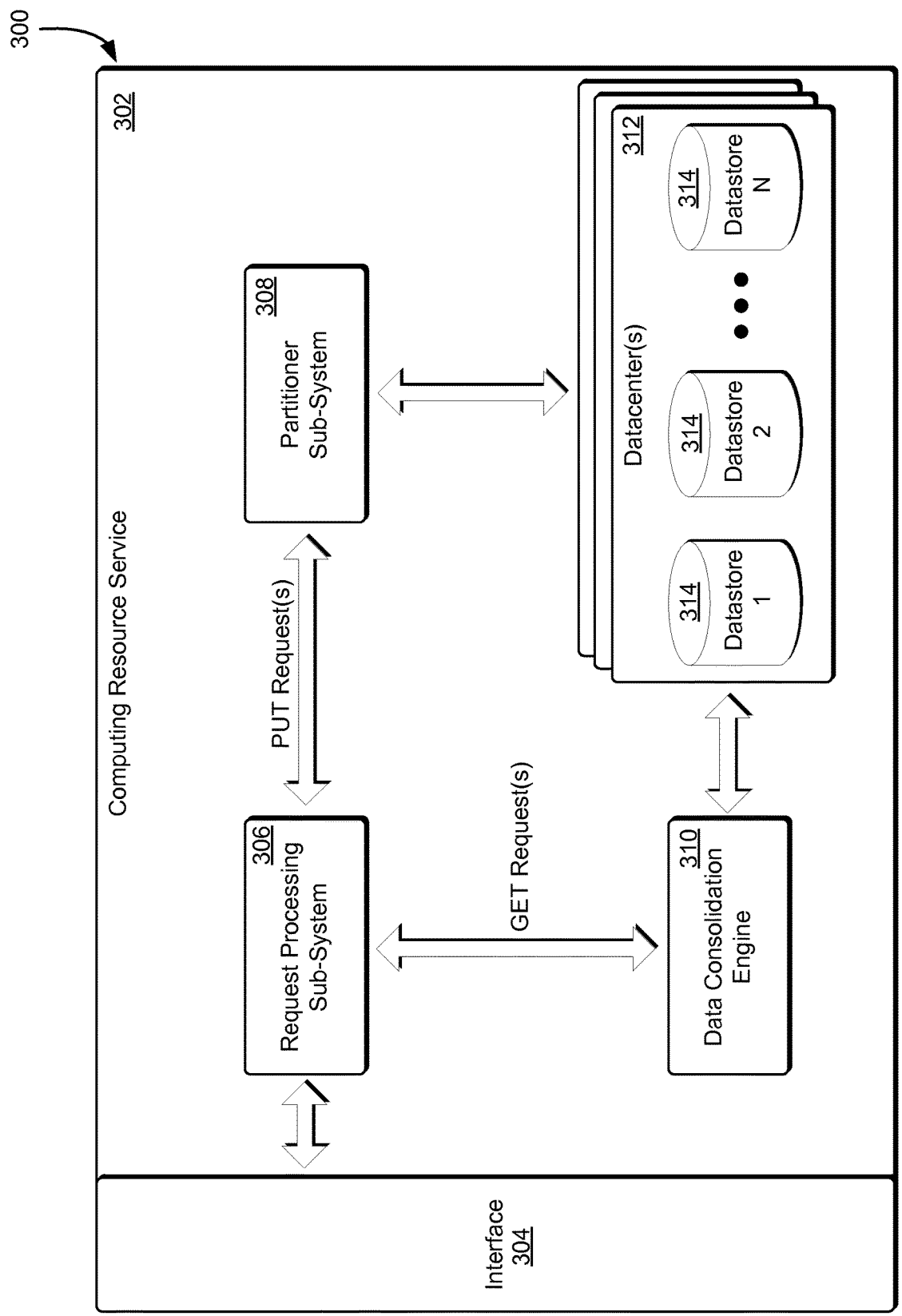
FIG. 3 shows an illustrative example of an environment in which various components of a computing resource service process GET requests to retrieve data and PUT requests to redundantly store data within one or more datastores in accordance with at least one embodiment.

As noted above, a computing resource service may be configured to process customer requests to retrieve data from one or more datastores of the service or to store data within the one or more datastores of the service. The computing resource service may utilize one or more quorum rules to determine when retrieval or storage of the data has been achieved successfully, thereby enabling fulfillment of customers' requests. Accordingly, FIG. 3 shows an illustrative example of an environment 300 in which various components of a computing resource service 302 process GET requests to retrieve data and PUT requests to redundantly store data within one or more datastores 314 in accordance with at least one embodiment. The computing resource service 302 comprise one or more computer systems, as will be described in greater detail below, that may be utilized to process customer requests and access one or more datastores 314 for storage and retrieval of data.

In the environment 300, the computing resource service 302 may provide customers with an interface 304 that may enable these customers to access the computing resource service 302. A customer may utilize the interface 304 through one or more communications networks, such as the Internet. The interface 304 may include certain security safeguards to ensure that the customer has authorization to access the computing resource service 302. For instance, in order to access the computing resource service 302, a customer may need to provide a username and a corresponding password or encryption key when using the interface 304. Additionally, requests (e.g., API calls) submitted to the interface 304 may require an electronic signature generated using a cryptographic key such that the electronic signature is verifiable by the computing resource service 302, such as by an authorization system (not shown).

Once the customer has gained access to the computing resource service 302 through the interface 304, the customer may submit a request to retrieve data from the computing resource service 302 or to store data within the computing resource service 302. These requests may be submitted through use of one or more API calls to the service 302, such as through us of a GET or PUT API call to the service 302. The computing resource service 302 may include a request processing sub-system 306, which may process these requests obtained from the customer through the interface 304 and determine which components of the computing resource service 302 may be utilized to perform the one or more tasks required to fulfill the customer's request. The request processing sub-system 306 may comprise one or more computer systems of the computing resource service 302 or modules of these one or more computer systems collectively configured to receive requests through the interface 304 and identify the parameters of the request to determine the components of the computing resource service 302 that may be utilized to fulfill the request.

If the received request is a request to retrieve data from one or more datastores 314 of the computing resource service (e.g., GET request), the request processing sub-system 306 may transmit a request to a data consolidation engine 310 to determine which datastores 314 include representations of the data necessary to fulfill the request and to retrieve and consolidate the data from these datastores 314. For instance, the GET request may include metadata for the data to be obtained from the computing resource service 302. The request processing sub-system 306 may hash the received metadata to generate an FQMI that can be used to locate the data being sought. The request processing sub-system 306 may transmit a query, along with the FQMI, to the data consolidation engine 310 in order to obtain the data required to fulfill the GET request. In response to the query, the metric consolidation engine 310 may access a mapping registry to determine where representations of the data needed to fulfill the GET request are stored. The data consolidation engine 310 may be a module of a computing system service 302 computer system configured to obtain data from a variety of datastores 314 and consolidate the data in order to fulfill GET requests.

Once the data consolidation engine 310 has identified the one or more datastores 314 within a plurality of datacenters 312 that include representations of the requested data, the data consolidation engine 310 may transmit a request to each of these datastores 314 to obtain individual representations of the data. The data consolidation engine 310, in response to these requests for representations of the data, may receive representations of the data from any number of datastores 314 at different times. For instance, while the requests to obtain the representations of the data may be transmitted at the same time by the data consolidation engine 310, the datastores 314 within each datacenter 312 may transmit their respective representations of the data at different times. Each datastore 314 may comprise hardware with varying capabilities, which may affect request response times from the datastore 314 to the data consolidation engine 310. Further, each datacenter 312 may be located at varying distances from the computer system wherein the module of the data consolidation engine 310 may be located. This may impact the network latency and, thus, the time in which a response to a request from the data consolidation engine 310 may be generated and transmitted to the data consolidation engine 310.

As the data consolidation engine 310 receives representations of the data from the datastores 314 of the various datacenters 312, the data consolidation engine 310 may determine whether a quorum may be achieved based at least in part on the received representations of the data. For instance, the data consolidation engine 310 may compare received representations of the data to determine whether there is concurrence amongst a minimum number of representations of the data to achieve a quorum among the datastores 314 of the datacenters 312. If a quorum has been reached, the data consolidation engine 310 may consolidate the received representations of the data to generate the data that is to be provided to the customer through the interface 304. Thus, the data consolidation engine 310 may transmit the consolidated data to the request processing sub-system 306, which may provide the consolidated data to the customer through the interface 304, fulfilling the request.

In some embodiments, if the data comprises various data segments, the data consolidation engine 310 will evaluate each data segment of the received representations of the data to determine whether quorum may be reached for each data segment. For instance, if quorum may be achieved for a particular data segment, the data consolidation engine 310 may utilize the data segment for the consolidated data to be provided to the customer in response to the customer's request. If quorum has not been reached for a particular data segment, the data consolidation engine 310 may await additional representations of the data from other datastores 314 to determine whether quorum may be reached for the particular data segment. If it is determined that quorum still cannot be reached and/or a timeout period has elapsed for obtaining additional representations of the data, the data consolidation engine 310 may determine that the particular data segment may not be obtained and either consolidate the other data segments or indicate an inability to obtain the data in response to the request.

In an embodiment, each datastore 314 is assigned a distinct weight based at least in part on the capabilities of the datastore 314 and the past reliability of the datastore 314. For instance, a greater weight may be assigned to a datastore 314 that has up-to-date hardware components and has demonstrated a high level of reliability (e.g., greater than 90% reliability) over a period of time. Alternatively a lower weight may be assigned to an older datastore 314 with lesser capabilities and/or a low level of reliability (e.g., less than 50% reliability) over a period of time. Thus, if a quorum may not be achieved based at least on failure of a minimum number of datastores 314 to provide equivalent representations of the data or representations of data segments for the data, the data consolidation engine 310 may utilize a representation of the data that corresponds to the datastores 314 that have provided equivalent representations of the data and have a greater combined weight than other combinations of datastores 314. This data may then be used to generate the consolidated data that is provided to the customer in response to its request.

When the request processing sub-system 306 obtains a PUT request from the interface 304 to redundantly store data among datastores 314 of a number of datacenters 312, the request processing sub-system 306 may transmit the data to be stored from the request and transmit the data to a partitioner sub-system 308, which may partition the data into a number of representations of the data for distribution to the datastores 314 within the various datacenters 312. A partitioner sub-system 308 may include one or more computer systems that are collectively configured to publish data from customer computer systems to the datastores 314 for redundant storage. The partitioner sub-system 308 may determine which datastores 314 within each datacenter 312 is to be used to store a representation of the data in response to the PUT request. For instance, the partitioner sub-system 308 may select a datastore 314 that has sufficient capacity to store a representation of the data from each datacenter 312. Alternatively, the partitioner sub-system 308 may select a datastore 314 at random from each datacenter 312. In another example, the partitioner sub-system 308 may select a configured number of datastores 314 among the various datacenters 312 for storage of representations of the data.

Once the partitioner sub-system 308 has identified which datastores 314 are to be provided with representations of the data for storage, the partitioner sub-system 308 may generate a number of representations of the data equal to the number of datastores 314 that are to be provided with a representation of the data. The partitioner sub-system 308 may subsequently transmit a representation of the data to each of the identified datastores 314 for storage. When a datastore 314 successfully stores the representation of the data or otherwise encounters an issue in storing the representation of the data, the datastore 314 may transmit a notification to the partitioner sub-system 308 indicating successful storage of the representation of the data or an issue with storage of the representation of the data. However, as described above, these notifications may be received by the partitioner sub-system 308 at different times, due to the different capabilities of the datastores 314 and the latency in the communications channels between the datastores 314 and the partitioner sub-system 308.

As the partitioner sub-system 308 receives notifications from the various datastores 314, the partitioner sub-system 308 may determine whether a minimum number of datastores 314 have successfully stored their respective representations of the data. If the minimum number has been reached (e.g., quorum), the partitioner sub-system 308 may determine that the data has been successfully stored within the various datastores 314 and stop monitoring for additional responses from other datastores 314. Further, the partitioner sub-system 308 may transmit a notification to the request processing sub-system 306 to indicate successful storage of the data. This may cause the request processing sub-system 306, through the interface 304, to inform the customer that its request has been fulfilled.

If the partitioner sub-system 308 has not obtained sufficient notifications indicating successful storage of the representations of the data within the datastores 314, the partitioner sub-system 308 may determine whether a quorum is still possible and whether a particular timeout period for obtaining these notifications has elapsed. If a quorum is no longer possible or the timeout period has elapsed, the partitioner sub-system 308 may indicate that the data cannot be stored successfully within the various datastores 314. However, if the timeout period has not elapsed and a quorum is still possible, the partitioner sub-system 308 may await additional responses and, upon obtaining any additional responses, determine whether a minimum number of datastores 314 have successfully stored their respective representations of the data.

Figure 4:
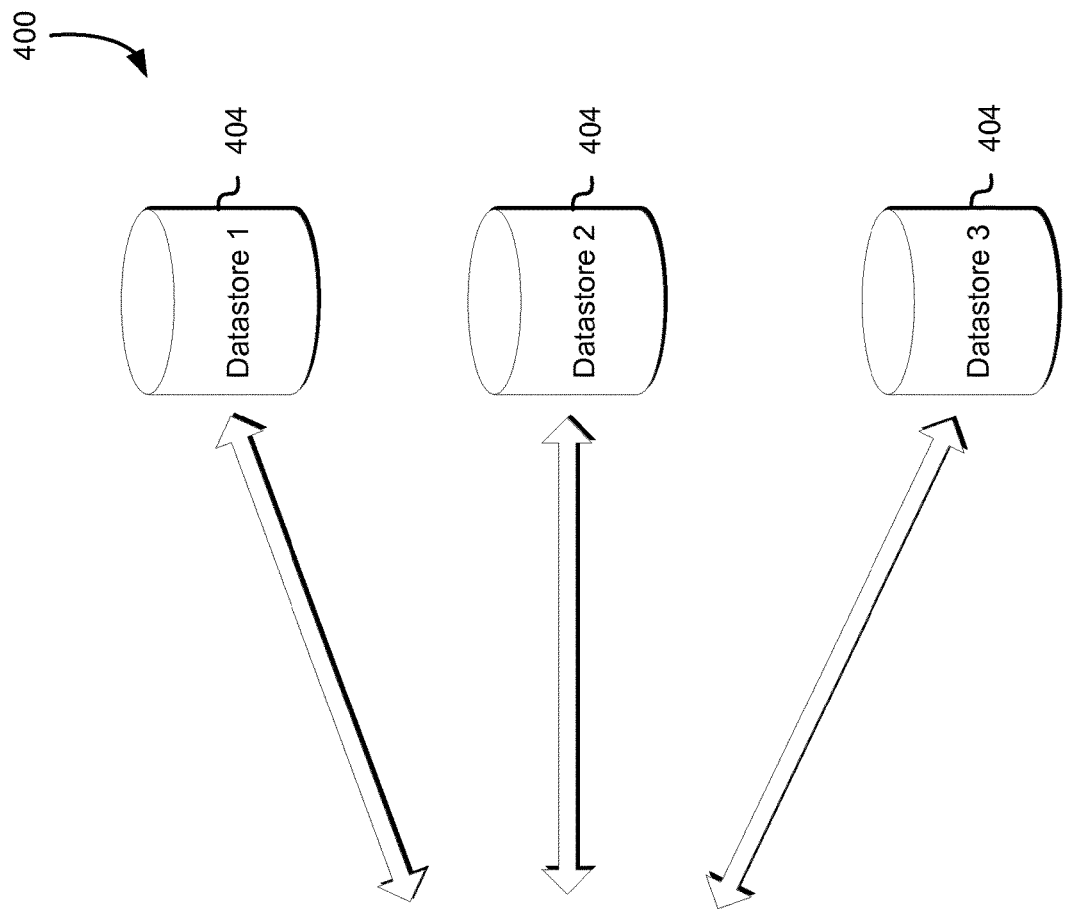
FIG. 4 shows an illustrative example of an environment in which a data consolidation engine of a computing resource service determines data to be provided in response to a GET request where portions of data have been obtained in accordance with at least one embodiment.

As noted above, the computing resource service, through use of a data consolidation engine, may evaluate representations of data obtained from various datastores to determine whether a quorum for the data has been reached. For instance, if at least a minimum number of datastores have provided representations of data that are identical, match, or are substantively the same, the computing resource service may provide this data to the customer in response to its request to retrieve the data. In some instances, the representations of data may each comprise a number of data segments which may include distinct data entries. These data segments may be consolidated to generate the complete set of data that is to be provided in response to the customer's request to retrieve the set of data. Accordingly, FIG. 4 shows an illustrative example of an environment 400 in which a data consolidation engine 402 of a computing resource service determines data to be provided in response to a GET request where portions of data (e.g., data segments) have been obtained in accordance with at least one embodiment.

In the environment 400, the data consolidation engine has obtained representations of the data from a number of datastores 404 (e.g., Datastore 1, Datastore 2, and Datastore 3). The representations of the data may not be identical. For instance, errors in transcription of the data may occur when storing a representation of the data within a datastore 404. Alternatively, as the data is updated over time, some datastores 404 may encounter errors whereby the most recent version of the data is not stored therein. As an illustrative example of this, the representations of data obtained from the datastores 404 as illustrated in FIG. 4 are not identical, whereby there may not be identical data segments among the three distinct representations of the data. Further, not all data segments may have been received prior to evaluation of these data segments by the data consolidation engine 402. For instance, the representation of the data 408 and the representation of the data 410 may include data for some data segments and not for others, as illustrated by the empty data segments.

When the data consolidation engine 402 obtains the representations of the data 406, 408, 410 from the datastores 404, the data consolidation engine 402 may evaluate each data segment of these representations of the data 406, 408, 410 to determine whether a quorum has been reached for each data segment. For instance, as illustrated in FIG. 4, the representation of the data 406 and the representation of the data 408 collectively concur with regard to the first two data segments (e.g., represented by the values "1" and "2"). If the minimum number of concurrent solutions is equal to two concurrent solutions, the data consolidation engine 402 may determine that a quorum has been reached for these two data segments as two datastores 404 have reported the same value for these two data segments. Thus, in preparing the data to be reported 412, the data consolidation engine 402 may utilize the concurred upon values for these first two data segments. Thus, regardless of what the representation of the data 410 indicates for these first two data segments, the values established through the quorum are utilized in the data to be reported 412. Further, since a quorum has been reached for these first two data segments, the data consolidation engine 402 may cease monitoring for the values of these two data segments from the third datastore, as these values are no longer necessary in preparing the data to be reported 412.

Similarly, for the third data segment, the representation of the data 406 and the representation of the data 410 collectively concur (e.g., represented by the value "3"). The data consolidation engine 402 may utilize this value for the third data segment in preparing the data to be reported 412. The data consolidation engine 402 may stop monitoring for additional values for the data segment from the second datastore as a quorum has already been reached, rendering additional information from this second datastore unnecessary in preparing the data to be reported 412.

If a quorum cannot be reached for a particular data segment, the data consolidation engine 402 may not report a value for the particular data segment and/or indicate an inability to obtain data for this particular data segment due to the inability to reach a quorum among the various datastores 404 for this data segment. For example, as illustrated in FIG. 4, the fourth data segment for the representations of the data 406, 408, 410 does not result in a quorum as the values reported by the representation of the data 406 and the representation of the data 410 are not equivalent and the representation of the data 408 has yet to provide a value for the fourth segment. Under such circumstances, the data consolidation engine 402 may await additional data from the datastore 404 corresponding to this representation of the data 408 (e.g., Datastore 2) to determine whether a value for this fourth data segment may be obtained within a timeout period and whether a quorum may be reached with another representation of the data 406, 410. If a quorum is subsequently reached, the data consolidation engine 402 may report this value within the data to be reported 412 for the fourth data segment. Otherwise, the data consolidation engine 402 may not report a value for this particular data segment or indicate its inability to obtain this value for the data segment.

In an embodiment, each datastore 404 has a different weight based at least in part on the hardware configuration of the datastore and the historical reliability of the datastore 404 over time. For instance, if the representation of the data 408 produces a distinct value for the fourth data segment, the data consolidation engine 402 may select a value for this fourth data segment corresponding to the datastore 404 with the greatest attributed weight. This value may then be utilized to consolidate the data segments in preparing the data to be reported 412.

Figure 5:
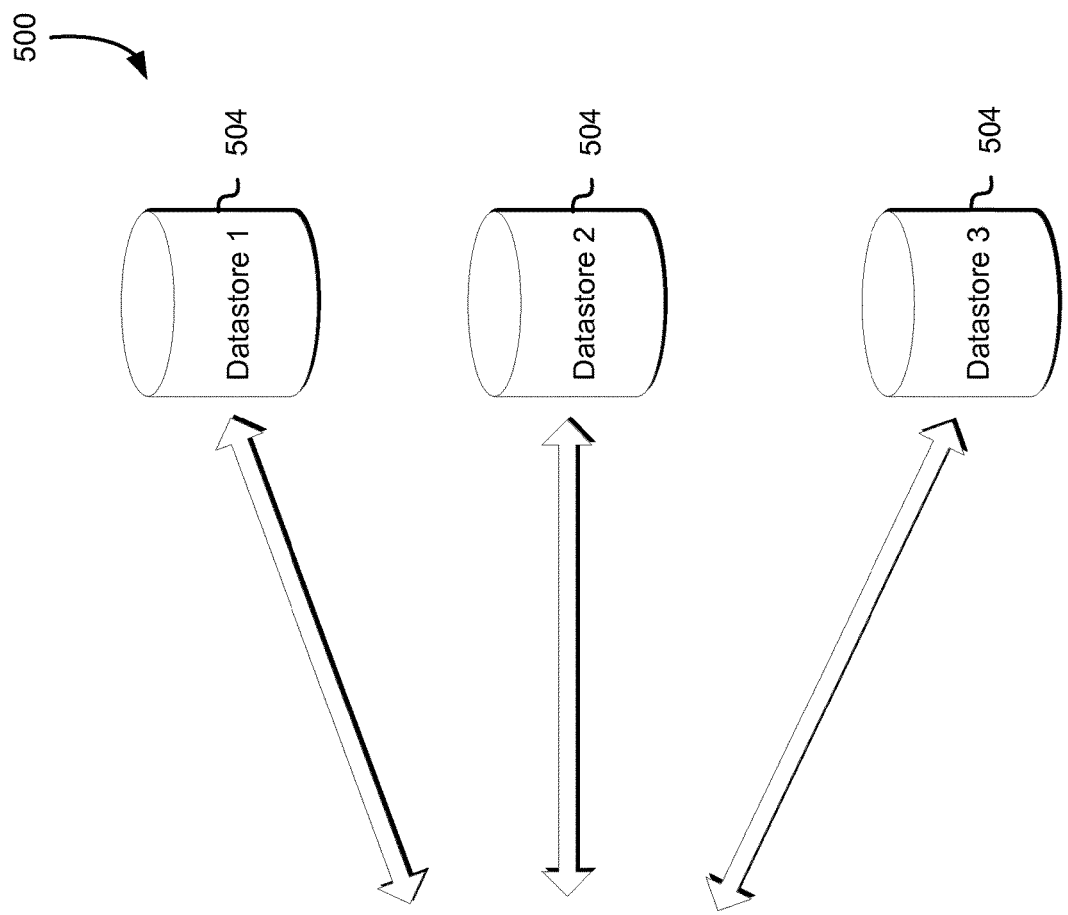
FIG. 5 shows an illustrative example of an environment in which a data consolidation engine of a computing resource service determines data to be provided in response to a GET request based at least in part on a quorum among datastores in accordance with at least one embodiment.

FIG. 5 shows an illustrative example of an environment 500 in which a data consolidation engine 502 of a computing resource service determines data to be provided in response to a GET request based at least in part on a quorum among datastores 504 in accordance with at least one embodiment. The environment 500 may be similar to the environment 400 described above in that the environment 500 includes a number of datastores 504 which have provided representations of the data 506, 508, 510 to the data consolidation engine 502 in response to a request from the data consolidation engine 502 to obtain these representations of the data 506, 508, 510. In this illustrative example, each datastore 504 has provided a complete representation of the data 506, 508, 510 that may be used to determine whether a quorum has been reached for each data segment and, if so, utilize the quorum values for preparing the data to be reported 512.

As illustrated in the environment 500, there is concurrence among at least two representations of the data 506, 508, 510 for each data segment. Each representation of the data 506, 508, 510 may be unique in that none of these representations of the data include the same data throughout. However, the data consolidation engine 502 may utilize the quorum rules to determine the data to be reported 512 for each data segment. For example, for the first two data segments and the fourth data segment, the first representation of the data 506 and the second representation of the data 508 concur, each reporting values of "1," "2," and "4" respectively, for these first two data segments and the fourth data segment. Since there is a quorum for these first two data segments and the fourth data segment based at least in part on the values specified in the first representation of the data 506 and the second representation of the data 508, the data consolidation engine 502 may utilize these values for the first two segments and the fourth segment of the data to be reported 512. The values for the first two data segments and the fourth data segment of the third representation of the data 510 may be disregarded or may not be evaluated, as quorum may have been achieved through evaluation of the first representation of the data 506 and the second representation of the data 508.

With regard to the third data segment, the data consolidation engine 502 may need to evaluate all three representations of the data 506, 508, 510 as the first representation of the data 506 may not concur with the second representation of the data 508 with regard to this third data segment. Thus, the data consolidation engine 502 may utilize the third representation of the data 510 to determine whether a quorum may be reached for this third data segment. As illustrated in FIG. 5, the value for the third data segment of the third representation of the data 510 is the same as the value for the third data segment of the first representation of the data 506. Thus, there is a quorum among the first representation of the data 506 and the third representation of the data 510 for this third data segment. The value specified within this third data segment for these representations of the data 506, 510 may thus be used to prepare the data to be reported 512.

Figure 6:
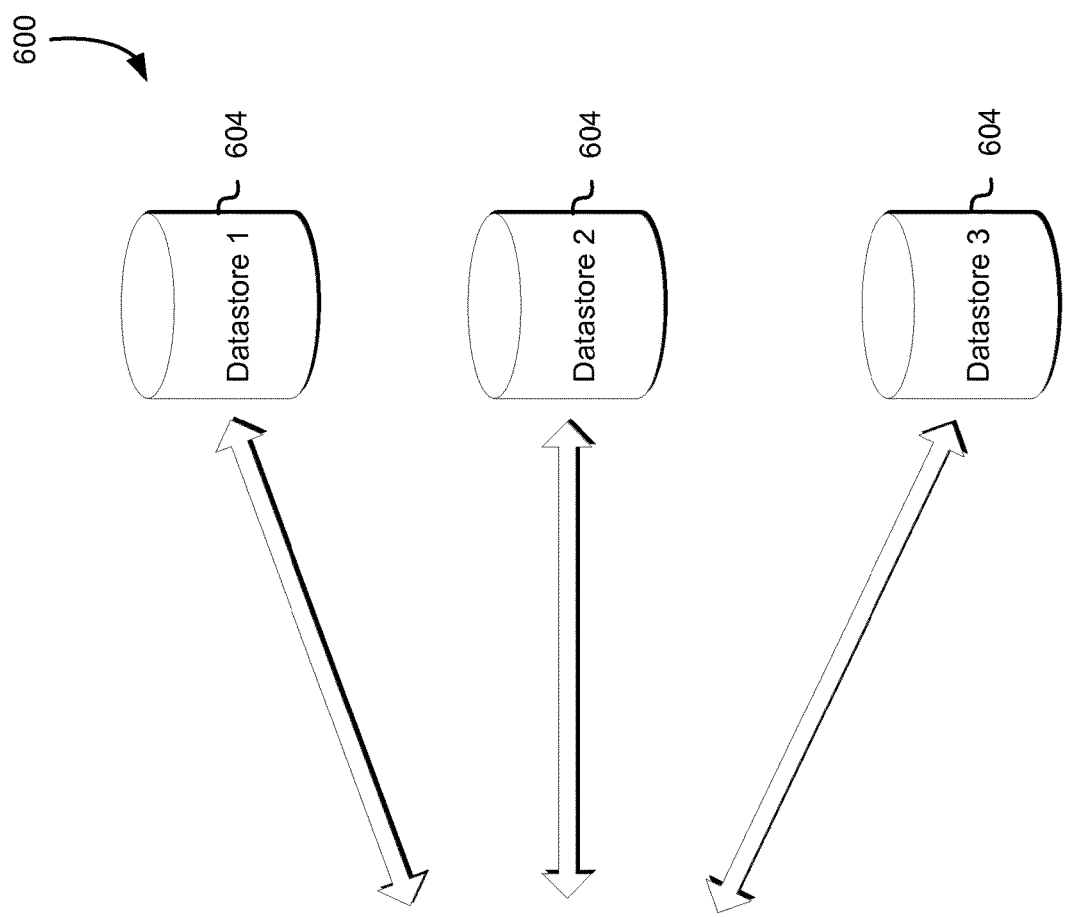
FIG. 6 shows an illustrative example of an environment in which a data consolidation engine of a computing resource service determines data to be provided in response to a GET request upon achieving a quorum among at least two datastores in accordance with at least one embodiment.
Figure 6:
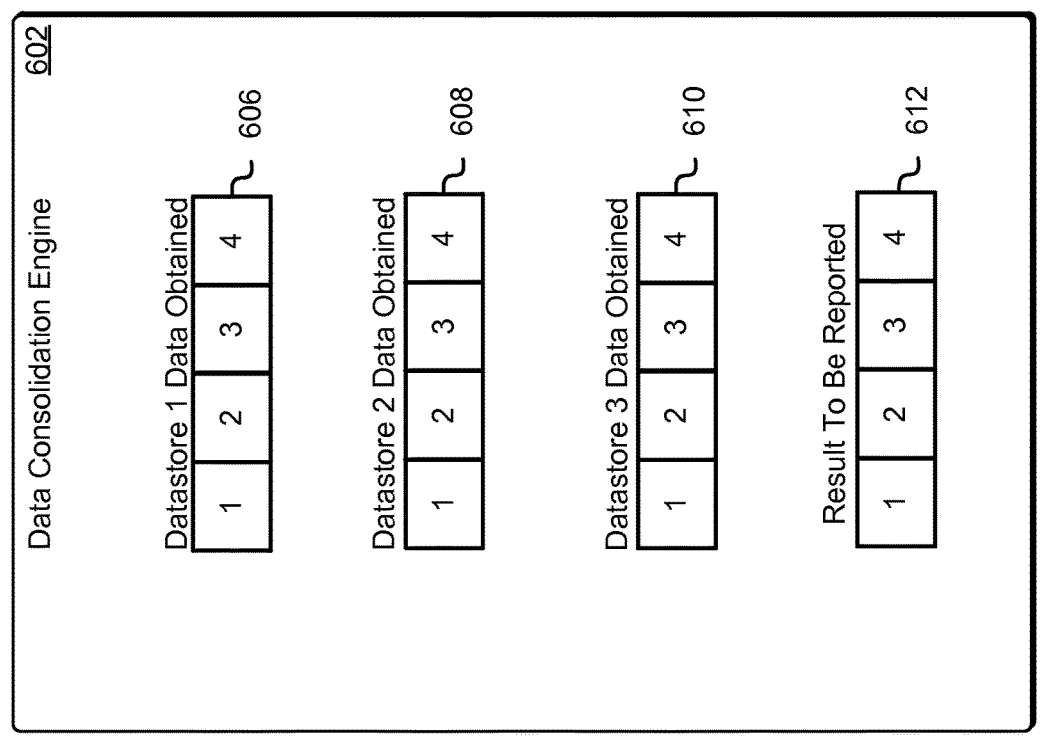

As another example of the evaluation performed by the data consolidation engine, FIG. 6 shows an illustrative example of an environment 600 in which a data consolidation engine 602 of a computing resource service determines data to be provided in response to a GET request upon achieving a quorum among at least two datastores 604 in accordance with at least one embodiment. In the environment 600, each datastore 604 has supplied representations of the data 606, 608, 610 that are identical to one another. For instance, the value for each data segment, as illustrated in FIG. 6, is identical among the representations of the data 606, 608, 610 as provided by the datastores 604 in response to the request from the data consolidation engine 602.

When the data consolidation engine 602 evaluates the first two representations of the data 606, 608, the data consolidation engine 602 may determine that a quorum has been reached for all the data segments of the data. The data consolidation engine 602 may utilize these values for the data segments to prepare the data to be provided 612 in response to the customer's request to retrieve certain data from the datastores 604. The data consolidation engine 602 may disregard the third representation of the data 610, even though the data concurs with the other representations of the data 606, 608, as a quorum has been reached. Further, the data consolidation engine 602 may stop monitoring for additional representations of the data from other datastores. The data consolidation engine 602 may thus provide the data to be reported 612 to a request processing sub-system, which may provide this data to the customer in response to its request for the data.

Figure 7:
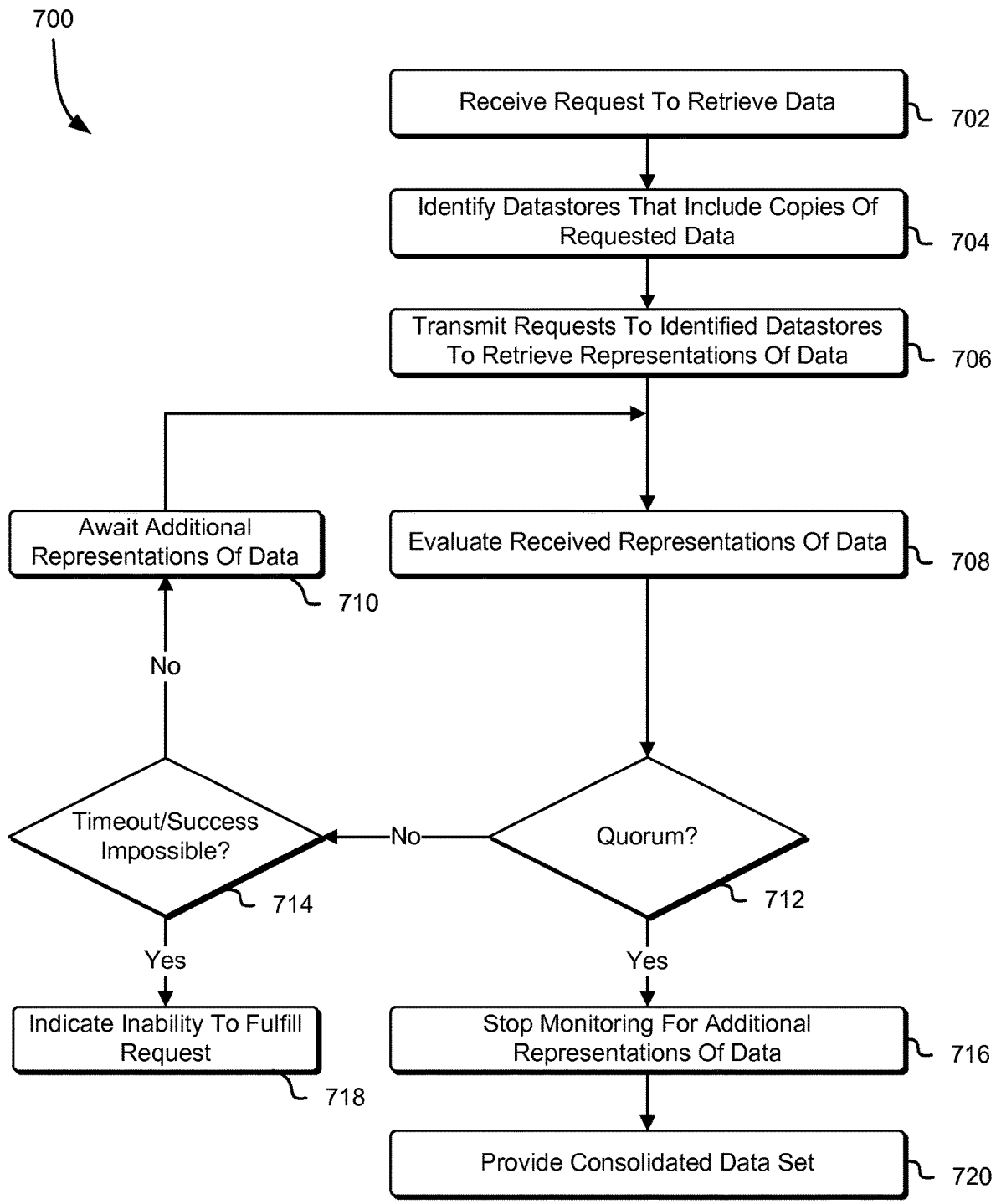
FIG. 7 shows an illustrative example of a process for processing GET requests wherein redundant representations of data are stored within a plurality of datastores and determining what data is to be provided in response to the requests in accordance with at least one embodiment.

As noted above, the computing resource service may receive requests from customers of a computing resource service provider to retrieve data from one or more datastores of the service. Each datastore of the service may have a representation of the data requested, which may cause the computing resource service to retrieve these representations of the data and consolidate the data for fulfillment of the request. In some embodiments, the computing resource service will determine whether a quorum has been reached with regard to the data to be provided such that if a minimum number of datastores have reported the same data, the computing resource service may consolidate this data for fulfillment of the request. Accordingly, FIG. 7 shows an illustrative example of a process 700 for processing GET requests wherein redundant representations of data are stored within a plurality of datastores and determining what data is to be provided in response to the requests in accordance with at least one embodiment. The process 700 may be performed by the aforementioned computing resource service, which may evaluate representations of data from various datastores to determine what data is to be provided to a customer in response to its request for data.

At any time, a customer may submit a request to the computing resource service to retrieve data from one or more datastores operated and maintained by the service. For instance, a customer may utilize an interface provided by the computing resource service to submit a GET API call to the service to obtain certain data. In order for the computing resource service to obtain the data necessary to fulfill the request, the customer may be required to provide metadata and a FQMI for the data that is to be obtained. Thus, the computing resource service may receive 702, at any time, a request to retrieve data. The request may be received through the interface utilized by the customer.

Once the computing resource service has received the request to retrieve data on behalf of a customer, the computing resource service may identify 704 the datastores that include representations of the requested data. For instance, when the data is initially stored within the datastores, as will be described in greater detail below in connection with FIG. 8, the computing resource service may generate representations of the data and transmit these representations of the data to a number of datastores that may be used to store the representations of the data. When the representations of the data are successfully stored in the datastores, the computing resource service may update a mapping registry to denote the location of these representations of the data and may utilize the FQMI of the data as an index that may be used to determine the location of these representations of the data. Thus, when the computing resource service receives the request from the interface, the computing resource service may utilize the FQMI for the data and the mapping registry to identify 704 the datastores that include these representations of the data.

The computing resource service may transmit 706 a request to individual datastores of the identified datastores that include the representations of the requested data in order to retrieve these representations of the data for evaluation. The computing resource service may transmit these requests to the identified datastores at the same time. However, as noted above, each datastore may be subject to different latency levels and comprise different hardware components that may affect the response time of the datastores in providing the requested representations of the data. Thus, as the computing resource service obtains representations of the data from the datastores, the computing resource service may evaluate 708 these received representations of the data to determine 712 whether a quorum may be reached for the requested data. The computing resource service may be configured to determine that a quorum has been reached when a minimum number of responses provide concurrence. For instance, if the minimum number of responses is equal to two and the computing resource service obtains two representations of the data that are the same (e.g., concur), the computing resource service may determine that a quorum has been reached for the data.

If, based at least in part on the obtained representations of the data and on an evaluation of these obtained representations of the data, the computing resource service determines that a quorum has not been reached, the computing resource service may determine 714 whether a timeout period for obtaining responses from the identified datastores has passed or whether a quorum is no longer possible (e.g. data retrieval success is impossible). If the timeout period has passed without a quorum, the computing resource service may indicate 718 an inability to fulfill the request to retrieve the data as a quorum could not be reached within the allotted time period and no additional responses have been obtained that may be used to determine whether a quorum is possible or not. Similarly, if the computing resource service has received numerous responses from the datastores but a quorum has not been reached, the computing resource service may indicate 718 an inability to fulfill the request if additional representations of the data obtained from the datastores would still not be sufficient to achieve a quorum.

If the timeout period has not elapsed and successful consolidation of the data is still possible, the computing resource service may await 710 additional representations of the data from any remaining datastores that have yet responded to the service request. As the computing resource service continues to receive these representations of the data, the computing resource service may evaluate 708 all received representations of the data to determine 712 whether a quorum has been reached. Once a quorum has been reached, the computing resource service may stop 716 monitoring for additional representations of the data, as the data may be consolidated based at least in part on the representations of data obtained that collectively represent the quorum reached. The computing resource service may provide 720 this consolidated data to the customer to fulfill the request.

It should be noted that in some embodiments, the process 700 can be performed using additional and/or alternative actions. For instance, if the representations of the data being retrieved from the identified datastores comprise a number of data segments, the computing resource service may evaluate the data segment for each of the received representations of the data to determine whether a quorum has been reached with regard to the data segment. If a quorum has been reached, the computing resource service may utilize the value of the data segment in consolidating the data to be provided in response to the customer's request. If a quorum cannot be reached for one or more data segments, the computing resource service may omit these data segments from the consolidated data to be provided and/or indicate an inability to obtain these data segments.

In an embodiment, individual datastores of the identified datastores are assigned different weights based at least in part on the capabilities of the individual datastores and the historical reliability of these individual datastores. For instance, a higher weight may be assigned to a datastore with up-to-date hardware components, low latency, and a high level of reliability compared to other datastores. If a quorum cannot be reached and a timeout period has passed, rather than indicating an inability to fulfill the request, the computing resource service may evaluate the received representations of the data and assign a weight to each received representation of the data based at least in part on the weight assigned to the datastores. If the combined weight for a particular data result surpasses a minimum threshold value, the computing resource service may provide this data result even though a quorum has not been reached within the allotted timeout period.

In another embodiment, once the computing resource service has determined that a quorum has been reached, the computing resource service terminates any pending requests for which a response (e.g., representation of the data) has been received. For instance, the computing resource service may terminate any Transmission Control Protocol/Internet Protocol (TCP/IP) connections to the datastores that may have pending requests to terminate these requests, as termination of the connections may prevent receipt of responses from these datastores. Alternatively, the computing resource service may transmit a command or instruction to these datastores to terminate the pending request. This may cause the affected datastores to terminate any processing associated with retrieval of the representations of the data. As another example, the computing resource may terminate or otherwise update a listener module monitoring for responses such that the computing resource service may no longer monitor for additional responses once a quorum has been reached.

Figure 8:
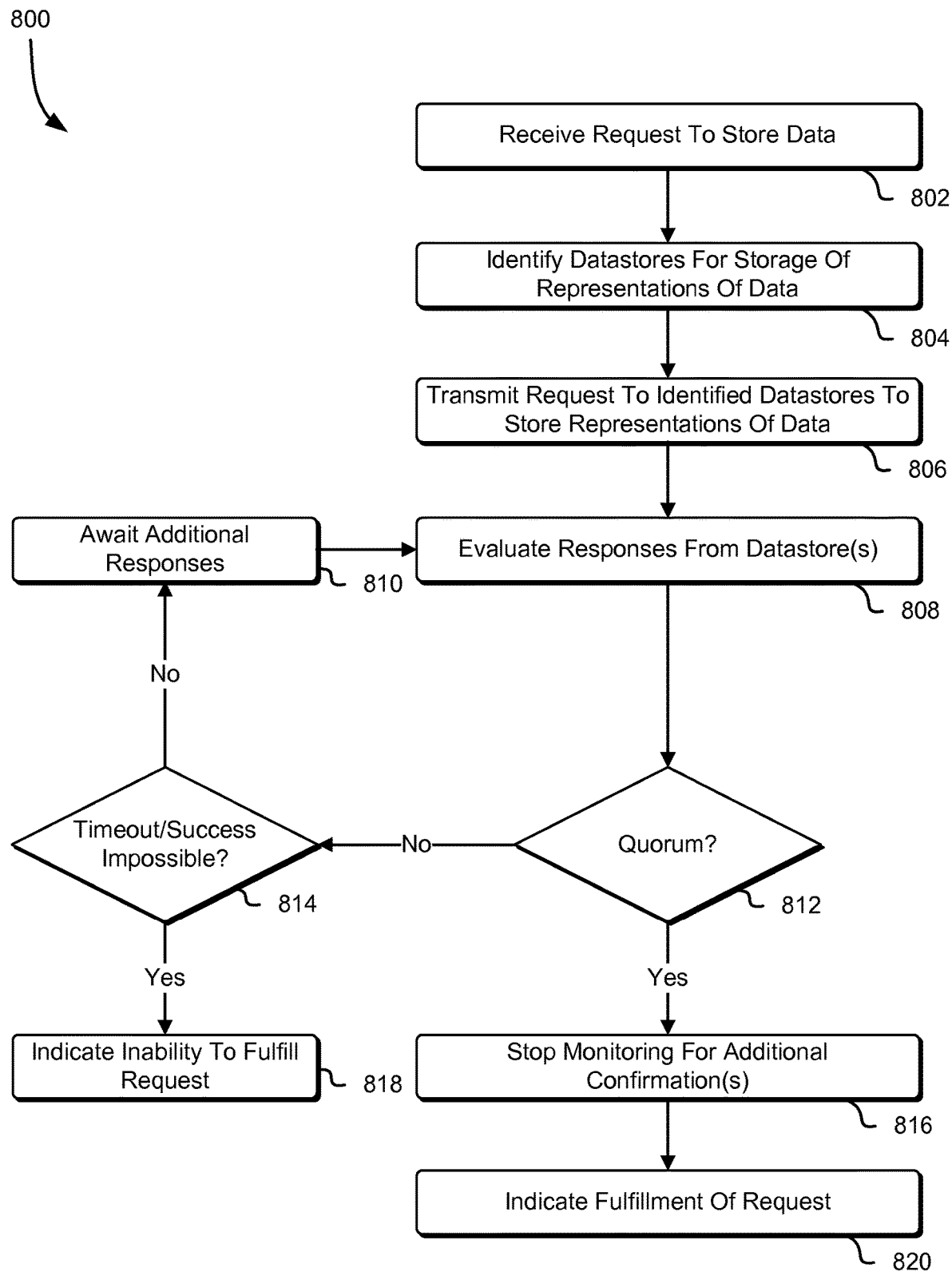
FIG. 8 shows an illustrative example of a process for processing PUT requests for storage of data wherein successful storage is determined when a number of redundant representations of the data are stored within a number of datastores in accordance with at least one embodiment.

As noted above, the computing resource service may receive requests from customers of a computing resource service provider to redundantly store data within a plurality of datastores of the service. The computing resource service may identify a number of datastores that are to be used to store representations of the data and transmit these representations of the data to these datastores for redundant storage. The computing resource service may determine that the data has been successfully stored if a minimum number of datastores have indicated that storage of their respective representations of the data have been stored successfully. Accordingly, FIG. 8 shows an illustrative example of a process 800 for processing PUT requests for storage of data wherein successful storage is determined when a number of redundant representations of the data are stored within a number of datastores in accordance with at least one embodiment. The process 800 may be performed by the aforementioned computing resource service, which may process PUT API calls from a customer and redundantly store representations of data from the customer within one or more datastores.

At any time, a customer may submit a request to the computing resource service to store data within one or more datastores operated and maintained by the service. For instance, a customer may utilize an interface provided by the computing resource service to submit a PUT API call to the service to store certain data. In order for the computing resource service to store the data to fulfill the request, the customer may be required to provide metadata and a FQMI for the data that is to be stored. The data may also be obtained from another service provided by the computing resource service provider on behalf of the customer. For instance, as the customer utilizes one or more resources of this other service, the other service may utilize the computing resource service as a data repository for these resources utilized by the customer. Thus, the computing resource service may receive 802, at any time, a request to store data within datastores of the computing resource service. The request may be received through the interface utilized by the customer or through an API call from another service.

Once the computing resource service has obtained the request to redundantly store data within a number of datastores of the computing resource service, the computing resource service may identify 804 the datastores that are to be used for redundant storage of the data. The computing resource service may determine that the data is to be redundantly stored among all the datastores operated and maintained by the computing resource service. Alternatively, the computing resource service may evaluate individual datastores of the plurality of datastores to determine which datastores have sufficient capacity for storage of a representation of the data. In another example, the computing resource service may select a default number of datastores at random that may be used to store representations of the received data.

The computing resource service may generate a number of representations of the data based at least in part on the number of identified datastores that are to be used for redundant storage of the data. The computing resource service may then transmit 806 a request to individual datastores of the identified datastores to store a representation of the data. The computing resource service may transmit these requests to the identified datastores at the same time. However, as noted above, each datastore may be subject to different latency levels and comprise different hardware components that may affect the response time of the datastores in providing confirmation of successful storage of their respective representations of the data or otherwise indicating that storage was unsuccessful. Thus, as the computing resource service obtains responses from the datastores, the computing resource service may evaluate 808 these responses to determine 812 whether a quorum may be reached for the successful storage of the data. The computing resource service may be configured to determine that a quorum has been reached when a minimum number of responses provide concurrence that the data has been successfully stored within the datastores. For instance, if the minimum number of responses is equal to two and the computing resource service obtains notifications from two datastores indicating successful storage of their respective representations of the data, the computing resource service may determine that a quorum has been reached.

If, based at least in part on the obtained responses from the datastores and on an evaluation of these responses, the computing resource service determines that a quorum has not been reached, the computing resource service may determine 814 whether a timeout period for obtaining responses from the identified datastores has passed or whether a quorum is no longer possible (e.g. data storage success is impossible). If the timeout period has passed without a quorum, the computing resource service may indicate 818 an inability to fulfill the request to store the data as a quorum could not be reached within the allotted time period and no additional responses have been obtained that may be used to determine whether a quorum is possible or not. Similarly, if the computing resource service has received numerous responses from the datastores but a quorum has not been reached indicating successful storage of the data, the computing resource service may indicate 818 an inability to fulfill the request as additional responses obtained from the datastores may still not be sufficient to achieve a quorum.

If the timeout period has not elapsed and successful storage of the data is still possible, the computing resource service may await 810 additional responses from any remaining datastores that have yet to indicate whether storage of the representation of the data has been performed successfully or not. As the computing resource service continues to receive these responses, the computing resource service may evaluate 808 all received responses to determine 812 whether a quorum has been reached for successful storage of the data. Once a quorum has been reached, the computing resource service may stop 816 monitoring for additional responses, as the data may be deemed to have been stored successfully based at least in part on the responses obtained that collectively represent the quorum reached. The computing resource service may subsequently indicate 820 fulfillment of the storage request.

Figure 9:
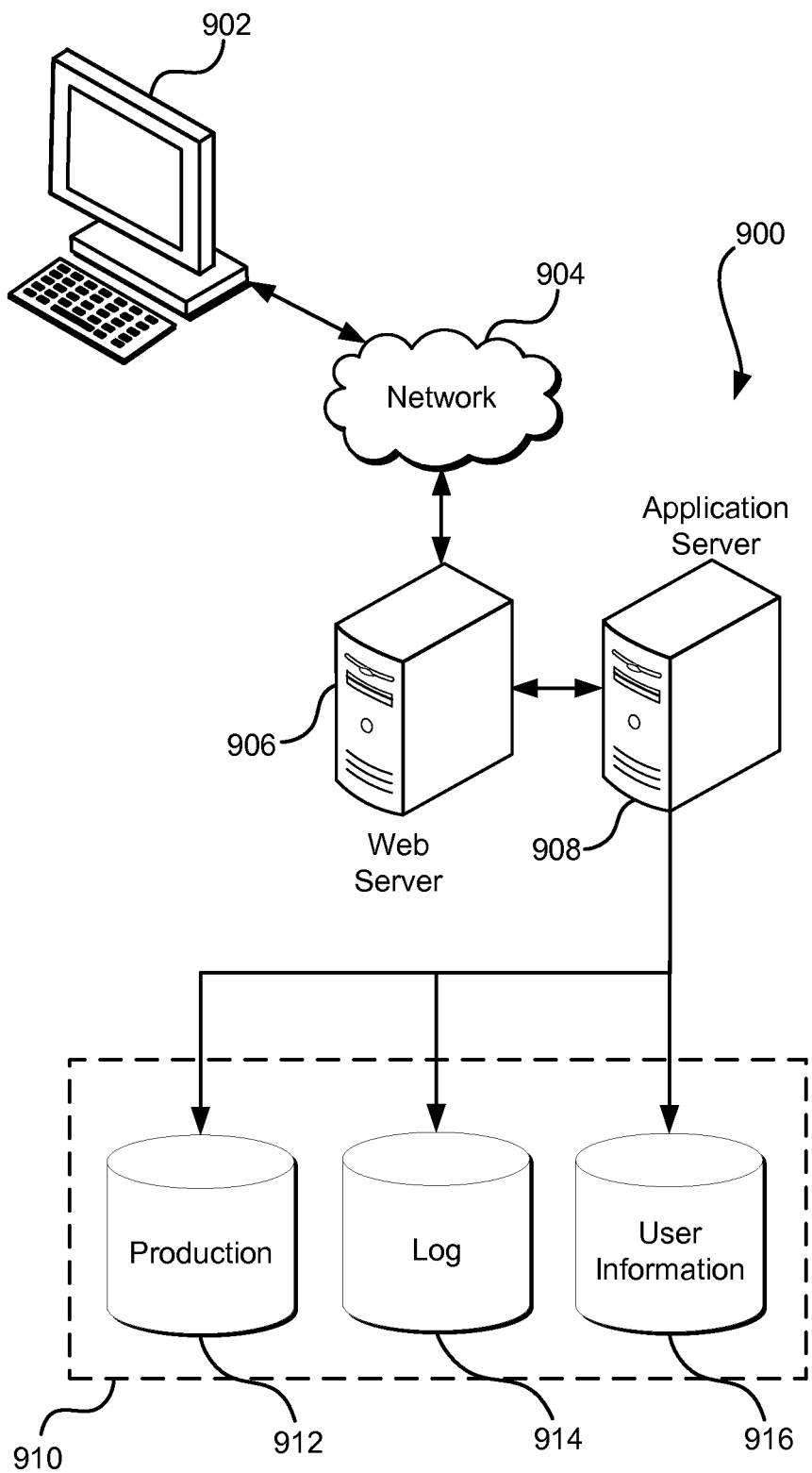
FIG. 9 shows an illustrative example of an environment in which various embodiments can be implemented.

FIG. 9 illustrates aspects of an example environment 900 for implementing aspects in accordance with various embodiments. As will be appreciated, although a web-based environment is used for purposes of explanation, different environments may be used, as appropriate, to implement various embodiments. The environment includes an electronic client device 902, which can include any appropriate device operable to send and/or receive requests, messages, or information over an appropriate network 904 and, in some embodiments, convey information back to a user of the device. Examples of such client devices include personal computers, cell phones, handheld messaging devices, laptop computers, tablet computers, set-top boxes, personal data assistants, embedded computer systems, electronic book readers, and the like. The network can include any appropriate network, including an intranet, the Internet, a cellular network, a local area network, a satellite network or any other such network and/or combination thereof. Components used for such a system can depend at least in part upon the type of network and/or environment selected. Protocols and components for communicating via such a network are well known and will not be discussed herein in detail. Communication over the network can be enabled by wired or wireless connections and combinations thereof. In this example, the network includes the Internet, as the environment includes a web server 906 for receiving requests and serving content in response thereto, although for other networks an alternative device serving a similar purpose could be used as would be apparent to one of ordinary skill in the art.

The illustrative environment includes at least one application server 908 and a data store 910. It should be understood that there can be several application servers, layers or other elements, processes or components, which may be chained or otherwise configured, which can interact to perform tasks such as obtaining data from an appropriate data store. Servers, as used herein, may be implemented in various ways, such as hardware devices or virtual computer systems. In some contexts, servers may refer to a programming module being executed on a computer system. As used herein, unless otherwise stated or clear from context, the term "data store" refers to any device or combination of devices capable of storing, accessing and retrieving data, which may include any combination and number of data servers, databases, data storage devices and data storage media, in any standard, distributed, virtual or clustered environment. The application server can include any appropriate hardware, software and firmware for integrating with the data store as needed to execute aspects of one or more applications for the client device, handling some or all of the data access and business logic for an application. The application server may provide access control services in cooperation with the data store and is able to generate content including, but not limited to, text, graphics, audio, video and/or other content usable to be provided to the user, which may be served to the user by the web server in the form of HyperText Markup Language ("HTML"), Extensible Markup Language ("XML"), JavaScript, Cascading Style Sheets ("CSS") or another appropriate client-side structured language. Content transferred to a client device may be processed by the client device to provide the content in one or more forms including, but not limited to, forms that are perceptible to the user audibly, visually and/or through other senses. The handling of all requests and responses, as well as the delivery of content between the client device 902 and the application server 908, can be handled by the web server using PHP: Hypertext Preprocessor ("PHP"), Python, Ruby, Perl, Java, HTML, XML or another appropriate server-side structured language in this example. Further, operations described herein as being performed by a single device may, unless otherwise clear from context, be performed collectively by multiple devices, which may form a distributed and/or virtual system.

The data store 910 can include several separate data tables, databases, data documents, dynamic data storage schemes and/or other data storage mechanisms and media for storing data relating to a particular aspect of the present disclosure. For example, the data store illustrated may include mechanisms for storing production data 912 and user information 916, which can be used to serve content for the production side. The data store also is shown to include a mechanism for storing log data 914, which can be used for reporting, analysis or other such purposes. It should be understood that there can be many other aspects that may need to be stored in the data store, such as page image information and access rights information, which can be stored in any of the above listed mechanisms as appropriate or in additional mechanisms in the data store 910. The data store 910 is operable, through logic associated therewith, to receive instructions from the application server 908 and obtain, update or otherwise process data in response thereto. The application server 908 may provide static, dynamic, or a combination of static and dynamic data in response to the received instructions. Dynamic data, such as data used in web logs (blogs), shopping applications, news services and other such applications may be generated by server-side structured languages as described herein or may be provided by a content management system ("CMS") operating on, or under the control of, the application server. In one example, a user, through a device operated by the user, might submit a search request for a certain type of item. In this case, the data store might access the user information to verify the identity of the user and can access the catalog detail information to obtain information about items of that type. The information then can be returned to the user, such as in a results listing on a web page that the user is able to view via a browser on the user device 902. Information for a particular item of interest can be viewed in a dedicated page or window of the browser. It should be noted, however, that embodiments of the present disclosure are not necessarily limited to the context of web pages, but may be more generally applicable to processing requests in general, where the requests are not necessarily requests for content.

Each server typically will include an operating system that provides executable program instructions for the general administration and operation of that server and typically will include a computer-readable storage medium (e.g., a hard disk, random access memory, read only memory, etc.) storing instructions that, when executed by a processor of the server, allow the server to perform its intended functions as described herein consistent with the invention.

The environment, in one embodiment, is a distributed and/or virtual computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 9. Thus, the depiction of the system 900 in FIG. 9 should be taken as being illustrative in nature.

The various embodiments further can be implemented in a wide variety of operating environments, which in some cases can include one or more user computers, computing devices or processing devices which can be used to operate any of a number of applications. User or client devices can include any of a number of computers, such as desktop, laptop or tablet computers running a standard operating system, as well as cellular, wireless and handheld devices running mobile software and capable of supporting a number of networking and messaging protocols. Such a system also can include a number of workstations running any of a variety of commercially-available operating systems and other known applications for purposes such as development and database management. These devices also can include other electronic devices, such as dummy terminals, thin-clients, gaming systems and other devices capable of communicating via a network. These devices also can include virtual devices such as virtual machines, hypervisors and other virtual devices capable of communicating via a network.

Various embodiments of the present disclosure utilize at least one network that would be familiar to those skilled in the art for supporting communications using any of a variety of commercially-available protocols, such as Transmission Control Protocol/Internet Protocol ("TCP/IP"), User Datagram Protocol ("UDP"), protocols operating in various layers of the Open System Interconnection ("OSI") model, File Transfer Protocol ("FTP"), Universal Plug and Play ("UpnP"), Network File System ("NFS"), Common Internet File System ("CIFS") and AppleTalk. The network can be, for example, a local area network, a wide-area network, a virtual private network, the Internet, an intranet, an extranet, a public switched telephone network, an infrared network, a wireless network, a satellite network, and any combination thereof.

In embodiments utilizing a web server, the web server can run any of a variety of server or mid-tier applications, including Hypertext Transfer Protocol ("HTTP") servers, FTP servers, Common Gateway Interface ("CGI") servers, data servers, Java servers, Apache servers, and business application servers. The server(s) also may be capable of executing programs or scripts in response to requests from user devices, such as by executing one or more web applications that may be implemented as one or more scripts or programs written in any programming language, such as Java®, C, C # or C++, or any scripting language, such as Ruby, PHP, Perl, Python or TCL, as well as combinations thereof. The server(s) may also include database servers, including without limitation those commercially available from Oracle®, Microsoft®, Sybase®, and IBM® as well as open-source servers such as MySQL, Postgres, SQLite, MongoDB, and any other server capable of storing, retrieving, and accessing structured or unstructured data. Database servers may include table-based servers, document-based servers, unstructured servers, relational servers, non-relational servers or combinations of these and/or other database servers.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers or other network devices may be stored locally and/or remotely, as appropriate. Where a system includes computerized devices, each such device can include hardware elements that may be electrically coupled via a bus, the elements including, for example, at least one central processing unit ("CPU" or "processor"), at least one input device (e.g., a mouse, keyboard, controller, touch screen or keypad) and at least one output device (e.g., a display device, printer or speaker). Such a system may also include one or more storage devices, such as disk drives, optical storage devices and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services or other elements located within at least one working memory device, including an operating system and application programs, such as a client application or web browser. In addition, customized hardware might also be used and/or particular elements might be implemented in hardware, software (including portable software, such as applets) or both. Further, connection to other computing devices such as network input/output devices may be employed.

Storage media and computer readable media for containing code, or portions of code, can include any appropriate media known or used in the art, including storage media and communication media, such as, but not limited to, volatile and non-volatile, removable and non-removable media implemented in any method or technology for storage and/or transmission of information such as computer readable instructions, data structures, program modules or other data, including RAM, ROM, Electrically Erasable Programmable Read-Only Memory ("EEPROM"), flash memory or other memory technology, Compact Disc Read-Only Memory ("CD-ROM"), digital versatile disk (DVD) or other optical storage, magnetic cassettes, magnetic tape, magnetic disk storage or other magnetic storage devices or any other medium which can be used to store the desired information and which can be accessed by the system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the invention to the specific form or forms disclosed, but on the contrary, the intention is to cover all modifications, alternative constructions and equivalents falling within the spirit and scope of the invention, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including" and "containing" are to be construed as open-ended terms (i.e., meaning "including, but not limited to,") unless otherwise noted. The term "connected," when unmodified and referring to physical connections, is to be construed as partly or wholly contained within, attached to or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. The use of the term "set" (e.g., "a set of items") or "subset" unless otherwise noted or contradicted by context, is to be construed as a nonempty collection comprising one or more members. Further, unless otherwise noted or contradicted by context, the term "subset" of a corresponding set does not necessarily denote a proper subset of the corresponding set, but the subset and the corresponding set may be equal.

Conjunctive language, such as phrases of the form "at least one of A, B, and C," or "at least one of A, B and C," unless specifically stated otherwise or otherwise clearly contradicted by context, is otherwise understood with the context as used in general to present that an item, term, etc., may be either A or B or C, or any nonempty subset of the set of A and B and C. For instance, in the illustrative example of a set having three members, the conjunctive phrases "at least one of A, B, and C" and "at least one of A, B and C" refer to any of the following sets: {A}, {B}, {C}, {A, B}, {A, C}, {B, C}, {A, B, C}. Thus, such conjunctive language is not generally intended to imply that certain embodiments require at least one of A, at least one of B and at least one of C each to be present.

Operations of processes described herein can be performed in any suitable order unless otherwise indicated herein or otherwise clearly contradicted by context. Processes described herein (or variations and/or combinations thereof) may be performed under the control of one or more computer systems configured with executable instructions and may be implemented as code (e.g., executable instructions, one or more computer programs or one or more applications) executing collectively on one or more processors, by hardware or combinations thereof. The code may be stored on a computer-readable storage medium, for example, in the form of a computer program comprising a plurality of instructions executable by one or more processors. The computer-readable storage medium may be non-transitory.

The use of any and all examples, or exemplary language (e.g., "such as") provided herein, is intended merely to better illuminate embodiments of the invention and does not pose a limitation on the scope of the invention unless otherwise claimed. No language in the specification should be construed as indicating any non-claimed element as essential to the practice of the invention.

Embodiments of this disclosure are described herein, including the best mode known to the inventors for carrying out the invention. Variations of those embodiments may become apparent to those of ordinary skill in the art upon reading the foregoing description. The inventors expect skilled artisans to employ such variations as appropriate and the inventors intend for embodiments of the present disclosure to be practiced otherwise than as specifically described herein. Accordingly, the scope of the present disclosure includes all modifications and equivalents of the subject matter recited in the claims appended hereto as permitted by applicable law. Moreover, any combination of the above-described elements in all possible variations thereof is encompassed by the scope of the present disclosure unless otherwise indicated herein or otherwise clearly contradicted by context.

All references, including publications, patent applications, and patents, cited herein are hereby incorporated by reference to the same extent as if each reference were individually and specifically indicated to be incorporated by reference and were set forth in its entirety herein.

What is claimed is:

1. A computer-implemented method, comprising:
obtaining, from a customer computer system, a request to retrieve a data set where fulfillment of the request involves retrieval of the data set from a plurality of datastores, the request including a fully qualified metric identifier for the data set;
utilizing the fully qualified metric identifier to identify the plurality of datastores that include corresponding versions of the data set;
transmitting a plurality of requests, the plurality of requests individually transmitted to respective datastores of the plurality of datastores to retrieve the corresponding versions of the data set;
performing an evaluation of the retrieved corresponding versions of the data set to detect that, for at least a minimum number of the corresponding versions of the data set, corresponding segments from different versions of the data set from different datastores of the plurality of datastores agree with one another, the evaluation resulting in a set of agreement segments of the data set;
processing, regardless of whether any additional response to an individual request of the plurality of requests is obtained, the set of agreement segments of the data set to generate a consolidated data set; and
providing the consolidated data set.

2. The computer-implemented method of claim 1, further comprising:
obtaining, from the customer computer system, a request to store a second data set where fulfillment of the request involves storage of corresponding versions of the second data set within a minimum number of the datastores;
identifying the datastores to be used to store the corresponding versions of the second data set;
transmitting a second plurality of requests, the second plurality of requests individually transmitted to the respective datastores of the plurality of datastores to store the corresponding versions of the second data set;
detecting storage of the corresponding versions of the second data set within the minimum number of the datastores; and
indicating fulfillment of the request to store the second data set.

3. The computer-implemented method of claim 1, further comprising, as a result of detecting that the corresponding segments from the different versions of the data set agree with one another, terminating pending requests of the plurality of requests for which a response has not been obtained.

4. The computer-implemented method of claim 1, further comprising:
determining, in response to the request to retrieve data set, an agreement rule usable to determine the set of agreement segments of the data set; and
using the agreement rule in the evaluation of the retrieved corresponding versions of the data set to detect that the corresponding segments from the different versions of the data set agree with one another.

5. A system, comprising:
one or more processors; and
memory, including instructions that, as a result of being executed by the one or more processors, cause the system to:

obtain a request to retrieve a data set;
transmit a plurality of requests to individual datastores of a plurality of datastores to retrieve corresponding versions of the data set; and
before all responses to the plurality of requests are obtained:
detect a quorum among the corresponding versions of the data set, wherein the quorum is detected as a result of corresponding segments from different versions of the data set from different datastores of the plurality of datastores agreeing with one another, resulting in a set of agreement segments of the data set; and
consolidate the set of agreement segments to generate a consolidated data set.

6. The system of claim 5, wherein the instructions further cause the system to, as a result of detection of the quorum, terminate any pending requests of the plurality of requests.

7. The system of claim 5, wherein the quorum is detected as a result of the corresponding segments from the different versions of the data set from the different datastores of the plurality of datastores agreeing with one another among at least a minimum number of the corresponding versions of the data set.

8. The system of claim 5, wherein the instructions further cause the system to provide the consolidated data set to fulfill the request.

9. The system of claim 5, wherein the instructions further cause the system to:
obtain a storage request to store a second data set, where fulfillment of the storage request involves storage of corresponding versions of the second data set within a minimum number of datastores of the plurality of datastores;
transmit a second plurality of requests to the individual datastores of the plurality of datastores to store the corresponding versions of the second data set; and
before all confirmations of storage of the corresponding versions of the second data set are obtained:
detect storage of the corresponding versions of the second data set within the minimum number of datastores; and
transmit a notification indicating that the storage request has been fulfilled.

10. The system of claim 5, wherein:
the request to retrieve the data set includes a fully qualified metric identifier for the data set; and
the instructions further cause the system to utilize the fully qualified metric identifier to identify the plurality of datastores that include the corresponding versions of the data set.

11. The system of claim 5, wherein the instructions further cause the system to continue obtaining responses from the plurality of datastores to detect the quorum.

12. The system of claim 5, wherein the instructions further cause the system to evaluate the corresponding versions of the data set in accordance with a quorum rule to detect the quorum.

13. A non-transitory computer-readable storage medium that stores thereon executable instructions that, as a result of being executed by one or more processors of a computer system, cause the computer system to at least:

obtain a request to retrieve a data set;
transmit a plurality of requests to individual datastores of a plurality of datastores to obtain corresponding versions of the data set;
process, regardless of whether any additional response to an individual request of the plurality of requests is obtained, obtained versions of the data set for which corresponding segments from different versions of the data set from different datastores of the plurality of datastores agree with one another, resulting in a set of agreement segments of the data set; and
compile the set of agreement segments to generate a consolidated data set.

14. The non-transitory computer-readable storage medium of claim 13, wherein the instructions further cause the computer system to identify a set of values from the set of agreement segments in order to compile the set of agreement segments.

15. The non-transitory computer-readable storage medium of claim 13, wherein the instructions further cause the computer system to:
obtain, from the request, an identifier associated with the data set; and
use the identifier to identify at least the plurality of datastores that store the corresponding versions of the data set.

16. The non-transitory computer-readable storage medium of claim 13, wherein the instructions further cause the computer system to terminate any pending requests as a result of obtaining the set of agreement segments of the data set.

17. The non-transitory computer-readable storage medium of claim 13, wherein the set of agreement segments of the data set are obtained as a result of the corresponding segments from the different versions of the data set agreeing with one another among at least a minimum number of the corresponding versions of the data set.

18. The non-transitory computer-readable storage medium of claim 13, wherein the instructions further cause the computer system to:
obtain a request to store a second data set;
identify a second plurality of datastores for storing corresponding versions of the second data set;
transmit a second plurality of requests to the second plurality of datastores to store the corresponding versions of the second data set;
obtain indications from a minimum number of datastores of the second plurality of datastores that the corresponding versions of the second data set have been stored; and
as a result of receiving the indications from the minimum number of datastores, indicate fulfillment of the request to store the second data set.

19. The non-transitory computer-readable storage medium of claim 13, wherein the instructions further cause the computer system to transmit the consolidated data set to a customer computer system to fulfill the request.

20. The non-transitory computer-readable storage medium of claim 13, wherein the instructions further cause the computer system to:
obtain a set of agreement rules usable to determine the set of agreement segments of the data set; and
detect, based at least part on the set of agreement rules, that the set of agreement segments has been obtained.

* * * * *